US006542789B2

(12) United States Patent
Ufheil

(10) Patent No.: US 6,542,789 B2
(45) Date of Patent: *Apr. 1, 2003

(54) TOOL RECOGNITION AND CONTROL SYSTEM FOR A WORK MACHINE

(75) Inventor: Steven T. Ufheil, East Peoria, IL (US)

(73) Assignee: Caterpillar Inc., Peoria, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/219,102

(22) Filed: Jun. 29, 2001

(65) Prior Publication Data

US 2001/0032031 A1 Oct. 18, 2001

(51) Int. Cl.$^7$ ................................................ G05B 19/04
(52) U.S. Cl. .......................................... 700/275; 701/50
(58) Field of Search ............................. 701/50, 65, 93; 700/275

(56) References Cited

U.S. PATENT DOCUMENTS

| | | | |
|---|---|---|---|
| 4,900,252 A | | 2/1990 | Liefke et al. |
| 5,182,908 A | | 2/1993 | Devier et al. |
| 5,249,421 A | | 10/1993 | Lunzman |
| 5,317,871 A | | 6/1994 | Ito et al. |
| 5,425,431 A | * | 6/1995 | Brandt et al. ............... 180/273 |
| 5,540,049 A | | 7/1996 | Lunzman |
| 5,576,962 A | | 11/1996 | Ferguson et al. |
| 5,590,731 A | | 1/1997 | Jacobson |
| 5,592,396 A | | 1/1997 | Tambini et al. |
| 5,653,155 A | | 8/1997 | Hausman et al. |
| 5,678,470 A | | 10/1997 | Koehler et al. |
| 5,692,376 A | * | 12/1997 | Miki et al. ................... 60/328 |
| 5,737,993 A | | 4/1998 | Cobo et al. |
| 5,897,600 A | * | 4/1999 | Elmore et al. ............... 701/50 |
| 6,061,617 A | * | 5/2000 | Berger et al. ................ 701/50 |
| 6,119,054 A | * | 9/2000 | Siki et al. ................... 700/275 |
| 6,167,337 A | * | 12/2000 | Haack et al. ................ 701/50 |
| 6,293,033 B1 | * | 9/2001 | Moriya et al. ............... 37/348 |
| 6,330,502 B1 | * | 12/2001 | Cetinkunt et al. ........... 37/414 |

FOREIGN PATENT DOCUMENTS

| EP | 0 408 160 A1 | 1/1991 |
|---|---|---|
| EP | 0 768 433 A1 | 4/1997 |
| EP | 0 860 557 A1 | 8/1998 |

* cited by examiner

Primary Examiner—Emanuel Todd Voeltz
Assistant Examiner—Edward F. Gain, Jr.

(57) ABSTRACT

A tool recognition and control system for electronically configuring certain systems of a work machine based upon the operating parameters associated with a particular work tool to be attached thereto, the work machine including systems operable to control the operation of a plurality of different work tools, each work tool having a set of operating parameters associated therewith which affect the operation of at least some of the systems of the work machine, the present control system identifying the particular work tool attached to the work machine based upon either a signal generated by a tool recognition system associated with the work tool when the work tool is attached to the work machine, or based upon operator selectable commands for selecting any one of a plurality of different sets of operating parameters based upon the particular work tool attached to the machine. Once the work tool has been identified and the appropriate set of operating parameters selected, an electronic controller coupled to the various systems of the work machine operable to control the operation of the various work tools outputs appropriate signals to such systems for electronically configuring such systems in accordance with the selected set of operating parameters for a particular work tool. Once configured, the affected systems will be compatible with the selected operating parameters for that particular work tool.

1 Claim, 2 Drawing Sheets

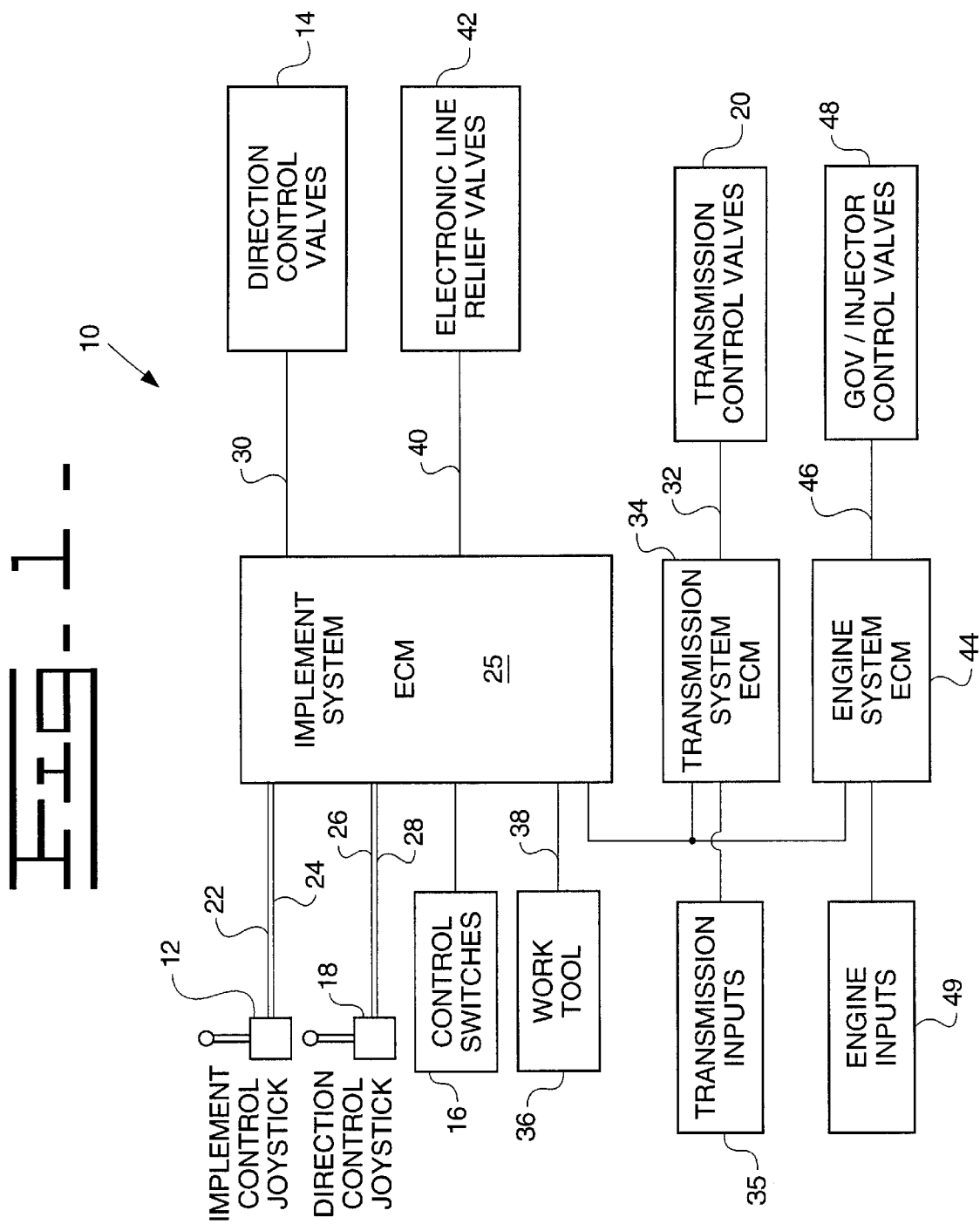

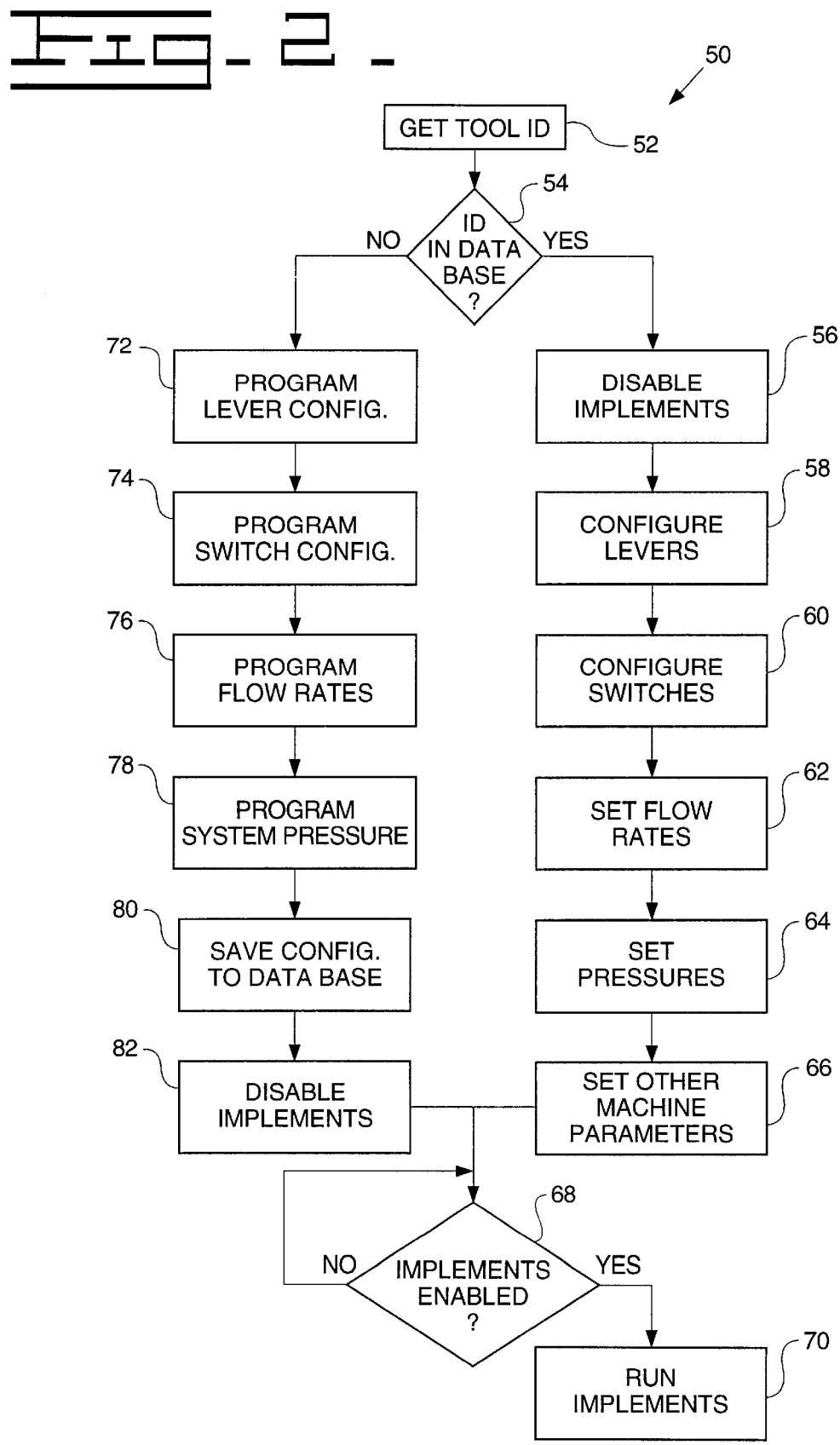

TOOL RECOGNITION AND CONTROL SYSTEM FOR A WORK MACHINE

TECHNICAL FIELD

This invention relates generally to a tool recognition and control system for use on a work machine and, more particularly, to a system and method for electronically configuring the hydraulic and control systems associated with a particular work machine to control the operation of a particular work tool mounted for use on the work machine based upon the operating parameters associated with the work tool.

BACKGROUND ART

Work machines such as integrated tool carriers, skid steer loaders, agricultural tractors, excavators and a wide variety of other work machines typically have a large number of hydraulically controlled work tools or attachments that are attachable or mountable to the particular work machine to perform a particular work function. These work tools or attachments are typically controlled through an implement control system which typically includes one or more hydraulic systems which are used to actuate and control the implement lift and/or tilt mechanisms. In the case of certain types of work machines such as skid steer loaders, a second and separate auxiliary hydraulic system is used to control the operation of hydraulic motors or actuators sometimes associated directly with the particular work tool or attachment to actuate and control the operation thereof.

In addition, these work tools or attachments are likewise controlled through the use of various operator input devices such as one or more implement control levers, foot pedals, or an implement control joystick. Still further, various switches associated with a particular work machine may likewise control the operation and function of certain work tools or attachments such as various switches located in the operator compartment which are used to select the direction of fluid flow to a particular attachment or work tool; to actuate continuous flow to a particular attachment or work tool in a selected direction; to select and engage a high fluid flow rate to the particular attachment or work tool; and other function specific switches associated with different types of work machines.

All of these different types of work tools or attachments differ in the way they are controlled and their hydraulic flow and pressure requirements likewise vary. For example, the operation of a certain series of switches associated with a particular work machine could represent one mode of operation for one tool whereas operation of the same series of switches for a different tool could represent a different mode of operation for that particular tool. Also, the operating pressures and flow rates associated with one tool may vary drastically when compared with the operating pressures and flow rates of another tool. For example, some work tools must be operated at a system pressure of 3000 PSI whereas other tools only need to operate at system pressures of 1000 PSI. In this regard, often times, depending upon the particular work tool involved and the particular application or task being performed by such work tool, full hydraulic flow to the particular work tool is not always necessary. In fact, under certain operation conditions, less than full or maximum flow provided by the implement hydraulic control circuit, or any other hydraulic circuit, is desirable. This is not always possible with the known systems and, as a result, hydraulic system flow rates often times exceed the task requirements for a particular tool. Still further, some of the older work tools cannot operate at the pressures and flow rates associated with the newer tools.

The control and operation of certain work tools may also affect the use and operation of the particular operator input device that controls the particular work tool such as one or more implement control levers, foot pedals, or a joystick. For example, skid steer loaders typically have a backhoe tool that can be attached to the machine. Presently, this backhoe tool has a separate set of controls, along with a seat, associated with the tool which must be utilized in lieu of the operator controls associated with the skid steer loader in order to allow the operator to control the backhoe tool. Also, depending upon the particular work tool, movement of the particular operator input device in one direction may command different tool responses depending upon the particular tool.

Presently, the various hydraulic systems associated with a particular work machine must be mechanically adjusted to achieve the correct fluid flow rates and pressures within the various hydraulic circuits prior to use of a particular tool. Also, the controls for some work tools, such as use of a backhoe tool with a skid steer loader, are so substantially different that a separate set of controls is added to the tool itself. These controls must be manually configured and adjusted by the machine operator. All of this manual reconfiguration time and effort adds cost to the particular work tool and certainly increases set-up time for the operator when switching from one work tool to another.

Still further, in certain situations, the operator input device that controls directional movement of the particular work machine may also be affected by use of a particular work tool. For example, certain work tools used on certain types of work machines require high engine speed in order to operate the work tool properly. These higher operating engine speeds produce a higher output flow from the hydraulic pump which controls the respective drive motors or drive mechanisms associated with the work machine. Generally, the higher the engine speed, the higher the pump flow available to the drive motors or drive mechanism, which higher pump flow creates a more responsive, less controllable machine at higher engine speeds. At a result, when these types of work tools are used, it is sometimes very difficult to control the steering of a particular work machine such as a skid steer loader, particularly in space limited environments.

It is therefore desirable to provide a tool recognition and control system which would automatically detect and identify the particular, type of work tool that is being attached or mounted to a particular work machine and, thereafter, automatically reconfigure the various controls and switches as well as the operating parameters of the various hydraulic systems necessary to operate the particular work tool to match the specific parameters and control functions for that particular work tool. Under certain conditions, it is also desirable to automatically reconfigure the operator input directional control device of a particular work machine based upon the particular type of tool or attachment being utilized on the work machine.

Accordingly, the present invention is directed to overcoming one or more of the problems as set forth above.

DISCLOSURE OF THE INVENTION

In accordance with the teachings of the present invention, a tool recognition and control system is disclosed wherein various control systems associated with a particular work machine are electronically reconfigured based upon the operating parameters of the particular work tool attached to the machine for use therewith. In one aspect of the present invention, each particular work tool which can be used with a particular work machine includes a unique identification code or other identifier means which is recognizable by the work machine when the tool is attached thereto. When attached or mounted to a particular machine, the tool recognition code for that particular tool, or a signal indicative thereof, is inputted to one or more electronic control modules (ECM) associated with the work machine and such identification code is thereafter used to select and access the specific operating parameters associated with that particular tool for reconfiguring the affected systems of the work machine as will be hereinafter explained. In this regard, the particular work tool will include circuit means or other recognition means which will provide a signal to one or more ECMs associated with the work machine indicative of the particular type of work tool being attached to that particular machine. This tool or attachment signal will have a unique pattern or waveform associated therewith which specifically identifies the type of tool or attachment being mounted to the work machine.

The various operating parameters associated with a particular work tool such as its operating hydraulic pressures and flow rates can be pre-programmed into one or more ECMs associated with the particular work machine such that once the particular tool is identified by the work machine, the ECM(s) will automatically select the stored parameters associated with the particular work tool and reconfigure the work machine based upon these parameters. More particularly, the various parameters associated with a particular tool machine can be programmed into the appropriate ECMs in the form of a plurality of look-up tables, maps, algorithms or other programming such that when the particular tool is identified by the work machine, the appropriate ECMs will output appropriate signals to the affected hydraulic system control valves, the affected line relief valves, and other affected hydraulic circuit components to set the appropriate hydraulic pressures and flow rates for the operation of that particular work machine.

In similar fashion, appropriate signals will be outputted by one or more ECMs associated with the work machine to reconfigure the appropriate operator input devices and switches such as the implement control levers or joystick, if necessary, for proper operation of the particular work tool. These types of reconfigurations would typically involve selecting various maps, tables or other correlations established for the operator input devices which would be representative of the appropriate pressures and flow rates which must be outputted from the appropriate control valves to the appropriate hydraulic cylinders, actuators and valves necessary for proper operation of the tool. The same is also true for any reconfiguration necessary with respect to the drive control operator input device such as changing the steering mode gain or correlation between displacement of the operator input steering device in any particular direction and operation of the respective drive transmission control valves which control the drive mechanism associated with the work machine.

For example, upon attaching the above-mentioned backhoe tool to a skid steer loader, the control system or ECM associated with the skid steer loader would recognize the backhoe tool and would thereafter reconfigure the hydraulic systems associated with such machine to run the backhoe at the appropriate operating pressures and flow rates, and the ECM would re-map the implement and direction control joysticks or other control levers associated with the machine to perform the boom, stick, bucket and swing functions. In this regard, the extra set of controls typically associated with a skid steer loader to operate the backhoe tool could be eliminated and the implement and directional control input devices would be reconfigured such that appropriate movements of these input devices will produce appropriate corresponding movements of the backhoe tool. Other correlations are likewise possible and anticipated depending upon the particular work machine and the particular work tools involved.

In another aspect of the present invention, the particular work machine can be configured to utilize a particular work tool through input from some type of external device or service tool such as a laptop computer. This would give the machine operator the ability to set the various systems and controls of the particular work machine utilized for operation of a particular tool to his specific control preferences. This set-up configuration would then be saved in a database that would be accessed each time that particular tool was attached to the work machine. This would likewise eliminate the additional set-up time which would be required each time that particular tool was mounted for use to that particular work machine.

The present tool recognition and control system can be incorporated into any work machine which controls the operation of different work tools in accordance with the teachings of the present invention.

BRIEF DESCRIPTION OF THE DRAWINGS

For a better understanding of the present invention, reference may be made to the accompanying drawings in which:

FIG. 1 is a schematic diagram of one embodiment of a tool recognition and control system constructed in accordance with the teachings of the present invention; and FIG. 2 is a flow chart of operating steps for the present tool recognition and control system constructed in accordance with the teachings of the present invention.

BEST MODE FOR CARRYING OUT THE INVENTION

A typical work machine incorporating the present tool recognition and control system would include some type of implement control system pivotally mounted to the main frame of the machine. Such implement control system can include one or more lift arms, or other articulated members, as well as one or more lift and/or tilt hydraulic cylinders for driving and controlling the operation of the implement system. Attachments or work tools are typically mounted to the front of the implement lift arm assembly by means of an attachment or tool mount. Hydraulic lift cylinders which drive the lift arms with respect to the main frame of the work machine and hydraulic tilt cylinders which drive the attachment mount with respect to the lift arms are supplied with hydraulic fluid by some type of implement hydraulic pump such as a constant displacement hydraulic pump. The flow of hydraulic fluid to the various valves and cylinders associated with the implement control system can be controlled through the use of one or more implement control levers, foot pedals, or an implement control joystick. Although it is recognized and anticipated that implement control levers, foot pedals and a wide variety of various other means can be utilized for actuating and controlling the implement system associated with a particular work machine without departing from the spirit and scope of the present invention, the present invention will be described herein with reference to an implement control joystick as illustrated in FIG. 1.

Many work machines also include a plurality of switches located in the operator compartment for likewise controlling various functions and operations of certain work tools. These switches typically control the flow of hydraulic fluid to various cylinders and actuators associated with the implement control system and/or a particular work tool and include switches such as directional flow switches, high flow switches, a continuous flow switch and so forth. Actuation of a certain plurality of switches in conjunction with one tool may command one mode of operation for that tool whereas operation of the same plurality of switches may command a different mode of operation for another tool.

The implement control joystick will typically be mounted on a console in the operator compartment of the work machine so as to be easily grasped and manipulated by the machine operator. This implement control joystick would be linked to a plurality of valves which are actuated by movement of the joystick to control the flow of hydraulic fluid to, for example, the lift and tilt cylinders. This implement control joystick is typically a two-axis joystick which may be pushed in the forward, rearward, left and right directions, to lower, raise, and tilt the attachment or work tool back and forth. The extent to which the implement control joystick is pushed in a certain direction controls the amount of hydraulic fluid supplied to the lift and tilt cylinders, and therefore affects the speed and movement of the work tool.

A typical work machine would also include some type of drive mechanism or transmission system for controlling the speed and maneuvering of the work machine. Such a drive mechanism may include left and right drive motors for controlling the speed of the tracks or wheel associated with the particular work machine. These drive motors are hydraulically controlled through respective transmission control valves which are supplied with hydraulic fluid by some type of hydraulic pump such as a constant displacement hydraulic pump. The flow of hydraulic fluid to the transmission control valves can be controlled through the use of one or more operator input control levers, or a drive or steering control joystick. Here again, although it is recognized and anticipated that a wide variety of various means can be utilized for actuating and controlling the transmission control valves, or other directional control mechanisms, without departing from the spirit and scope of the present invention, the present invention will be described with reference to a direction control joystick as illustrated in FIG. 1.

Since some work tools operate at different operating pressures and flow rates and therefore demand more or less from the hydraulic pump and hydraulic circuit servicing such work tool, the hydraulic systems and other control systems associated with a particular work machine must be mechanically adjusted for the operation of a particular work tool. In fact, under certain operating conditions, system pressures and flow rates often times exceed the particular task requirements being performed by a particular tool. As a result, the present invention is designed to provide a system and method for automatically reconfiguring the various hydraulic and control systems associated with a particular work machine to match the particular operating parameters associated with a particular work tool.

Referring to FIG. 1, numeral 10 in FIG. 1 represents one embodiment of the present tool recognition and control system associated with a typical work machine. As illustrated in FIG. 1, a typical work machine will include some type of operator input implement control device such as the implement control joystick 12 which is typically mounted on a console in the operator compartment for easy manipulation by the machine operator. As previously explained, the implement control joystick 12 is coupled or linked to a plurality of valves which are actuated by movement of the joystick to control the flow of hydraulic fluid to various cylinder and actuators associated with the various hydraulic systems associated with the work machine. The control valves used to control the hydraulic fluid flow to the respective hydraulic circuits are represented by the direction control valves 14 illustrated in FIG. 1.

The joystick 12 is typically a two axis joystick which may be pushed in the forward, rearward, left and right directions to control movement of the particular work tool mounted to the machine. For example, movement of the joystick 12 may lower, raise, dump and rack a bucket or other similar type work tool attached to the machine. The extent to which the joystick 12 is pushed in a certain direction controls the amount of hydraulic fluid supplied to the control valves 14.

In a similar fashion, activation and control of various hydraulic motors and other actuators associated with certain types of work tools are typically commanded through the use of a plurality of switches located in the operator compartment such as the control switches 16 illustrated in FIG. 1. These switches may include any number of different types of switches controlling various functions of the work tool such as controlling the direction of flow in a forward or reverse direction to the work tool; controlling the amount of flow in the forward or reverse direction to a particular work tool; and activating and controlling continuous flow to the work tool in a selected direction. Operator input to the control switches 16 will typically control output signals to proportional pilot pressure solenoids or control valves located in a particular hydraulic circuit such as the control valves 14 illustrated in FIG. 1.

A typical work machine will also include a direction control joystick 18 which is likewise typically mounted on a console in the operator compartment so as to be easily grasped and manipulated by the machine operator. The direction control joystick 18 is typically coupled or linked to a plurality of proportional solenoids or transmission control valves such as the valves 20 illustrated in FIG. 1, which control valves are actuated by movement of the joystick to control the flow of hydraulic fluid thereto. The joystick 18 is likewise typically a two-axis joystick which may be pushed in the forward, rearward, left and right directions to move or steer the work machine accordingly. Fore and aft movement of the joystick typically controls the forward and reverse direction of the work machine whereas the left and right movement of the joystick 18 would control movement of the work machine to the left and right. The extent to which the joystick 18 is pushed in a certain direction controls the amount of hydraulic fluid supplied to the transmission control valves 20 and therefore affects the speed and movement of the work machine.

The joystick 12 is coupled to an electronic control module (ECM) such as the implement system ECM 25 via conductive paths 22 and 24. Conductive path 22 would be associated with one axis of the implement control joystick 12 such as up and down movement of the work tool whereas conductive path 24 would be associated with the other axis of the joystick such as the left and right control axis which would control the dumping and racking of a particular work tool. The amount of movement or displacement of the joystick 12 in a particular direction will control the speed and particular movement or function of the work tool. ECM 25 senses this joystick displacement and outputs appropriate signals via conductive path 30 to control the respective hydraulic circuit control valves 14 in accordance with the operator input to the joystick 12.

In similar fashion, the joystick 18 is coupled to ECM 25 via conductive paths 26 and 28. Conductive path 26 would be associated with one axis of the joystick 18 such as the fore and aft control axis whereas conductive path 28 would be associated with the other axis of the joystick 18 such as the left and right control axis. The amount of movement or displacement of the joystick 18 in either the fore and aft direction will control the ground speed of the work machine whereas the amount of movement or displacement of the joystick 18 to the left or right will control the rate of turn of the machine. ECM 25 senses this joystick displacement via conductive path 26 and, though ECM 34, outputs appropriate signals via conductive path 32 to the transmission control valves 20 to achieve the commanded forward or reverse speed, and any commanded turn.

In the embodiment illustrated in FIG. 1, ECM 25 is serially linked to the transmission system ECM 34 such that steering commands inputted to ECM 25 by the direction control joystick 18 can likewise be inputted to ECM 34 for outputting signals via conductive path 32 to the appropriate transmission control valves 20. It is also recognized and anticipated that joystick 18 could be directly coupled to ECM 34 and serially linked to ECM 25 and other ECMs for appropriate use. In this regard, other inputs to ECM 34 may also be utilized to control the operation of the transmission control valves 20 such as the transmission inputs 35 illustrated in FIG. 1. These additional inputs 35 may include gear speed and direction, gear position, engine speed, and other operating parameters.

The various solenoids and control valves such as the valves 14 and 20 are used in a conventional manner to control the hydraulic flow to the various hydraulic systems and drive mechanism associated with a particular work machine. These control valves and solenoids are typically controlled by the amount of displacement associated with the respective joysticks 12 and 18. For example, displacing the joysticks 12 and 18 a certain amount in the forward, reverse, left or right direction will result in ECMs 25 and 34 outputting signals via the appropriate conductive paths 30 and/or 32 to energize the appropriate control valves and/or solenoids proportional to the amount of displacement applied to the respective joysticks in the appropriate direction. In this regard, once the deadband associated with the respective joysticks is overcome in either the forward, reverse, left or right direction, the current to the appropriate solenoids or valves will be commanded to a threshold level. The current to the appropriate solenoids or valves will continue to increase as the respective joystick is further displaced in the selected direction. Maximum current will be obtained when the joysticks are fully displaced in the appropriate direction. Releasing the joysticks 12 and 18 will allow the joysticks to return to their neutral position, turning off current to the respective solenoids or valves. When ECMs 25 and 34 output a signal to one or more of the appropriate control valves 14 and 20, such signals are indicative of a certain amount of current based upon the displacement of the respective joystick in a particular direction. The control valves thereafter convert such current signal into a pressure or flow through the valve to the respective cylinders, actuators, or drive motors for controlling movement of the work tool as well as movement of the work machine.

The various work tools associated with a particular work machine such as the work tool 36 illustrated in FIG. 1 include a unique or specific identification code which will be recognizable by ECM 25 or some other ECM when the tool 36 is attached to the work machine. This tool identification/recognition system or code may include a linear bar code, a two-dimensional code, or some other coding system associated with the work tool 36 such that when the tool 36 is attached or otherwise mounted to the work machine, an appropriate scanner or reader such as an optical scanner, a laser scanner, or a magnetic scanner or reader would be positioned and located so as to read the specific identification code associated with the tool 36 and input such code or recognition thereof via conductive path 38 to ECM 25. It is also recognized and anticipated that the tool identification code could likewise be incorporated into a plug and socket arrangement wherein the pin pattern associated therewith would be unique to the specific work tool and serve as an identification code for identifying and recognizing that particular work tool.

Still further, the work tool identification system could comprise an rf telemetry system. The work tool 36 would include appropriate electronics and circuitry to output an rf signal encoded with a specific identification code unique to that particular work tool to be received by an rf receiver positioned and located on the work machine. The rf receiver would decode the work tool signal and convert such signal back into an electrical signal, that is, either an analog or a digital type signal. This converted signal would be indicative of the particular type of work tool mounted to the work machine and this signal would be inputted via conductive path 38 to ECM 25. Regardless of the specific type of tool recognition means utilized, the identification code associated with work tool 36 is ultimately conveyed to ECM 25 via a work tool signal indicative of the particular type of work tool being mounted to the work machine.

The various operating parameters associated with a particular work tool such as the work tool 36 illustrated in FIG. 1 can be pre-programmed into one or more ECMs associated with a particular work machine such as ECM 25 in the form of a plurality of look-up tables, operating maps, algorithms or other programming such that when the particular tool 36 is recognized by ECM 25, ECM 25 will access the appropriate operating parameters for that particular tool. For example, the operating hydraulic pressures and flow rates associated with a particular work tool can be stored within the memory of ECM 25 in the form of a plurality of maps or tables. When the work tool 36 is identified, ECM 25 will access the appropriate operating pressures and flow rates from the appropriate maps or tables and output appropriate signals to the affected valves to set the appropriate pressures and flow rates for the operation of that particular work machine. This reconfiguration of the hydraulic pressures and flow rates can be accomplished by outputting a signal from ECM 25 via conductive path 40 to a plurality of electronically adjustable line relief valves 42 (FIG. 1) wherein the output signal 40 will electronically set the maximum pressure and flow rates for the particular hydraulic circuits involved with the operation of that particular tool. In the past, these electronically adjustable line relief valves have been manually recalibrated by the operator when the work tool is mounted to the machine. Other means for electronically reconfiguring the flow rates and pressures associated with a particular hydraulic circuit such as by electronically adjusting certain main relief valves and/or certain independent metering valves can likewise be utilized to accomplish this task.

In similar fashion, based upon the particular work tool involved, certain control switches such as the switches 16 can likewise be reconfigured by ECM 25. For example, in the case of a hammer or clamshell bucket type work tool, certain switches located in the operator compartment of a particular work machine will control the direction of fluid flow to the tool, that is, a forward or reverse direction. Use of these switches for these particular work tools would be in the form of momentary switches wherein the machine operator would hold the appropriate switch in its depressed or engaged state in the selected direction for as long as the operator desires to utilize the tool in that particular function or application. On the other hand, if the work tool is a broom or sweeper, such tools will typically rotate in a forward or reverse direction at a constant speed. The same switches which control the direction of fluid flow to a hammer or bucket type work tool, would also contact the direction of fluid flow to the broom or sweeper, that is, whether the broom or sweeper will rotate in a forward direction or a reverse direction. In the case of the broom or sweeper type tool, these same switches can now function as an on/off type switch wherein continuous flow in the selected direction to the broom or sweeper type tool can be activated with a first activation of the appropriate switch, and such continuous flow to the particular tool can be deactivated with a subsequent activation of the same switch. This reconfiguration of the operation of these types of switches can be accomplished by accessing additional programming associated with ECM 25 or any other appropriate ECM, such that upon each activation of such switches, ECM 25 will sense when such switches go from an open state to their closed state. In order words, ECM 25 will sense the rising edge of the signal inputted by such switches regardless of how long such switches are held in their engaged or depressed state. This particular programming format for such switches will be accessed and implemented when such a tool is identified through the present tool recognition system. It is recognized and anticipated that other programming means as well as appropriate circuitry can be likewise utilized to accomplish the reconfiguration of certain switches based upon the particular work tool involved.

Still further, ECM 25 can likewise reconfigure the operation of the joysticks 12 and/or 18, if necessary, based upon the particular work tool 36 recognized by ECM 25. For example, in the case of a skid steer loader, the implement joystick 12 will typically control the lift and tilt movement of a particular work tool such as a bucket whereas the drive control joystick 18 will typically control the traveling movement of the skid steer loader. When a backhoe tool is mounted to a typical skid steer loader, the digging operation involved with the backhoe requires the use of both joysticks in order to successfully accomplish a dig. In this particular situation, both joysticks must be reprogrammed or reconfigured manually by the operator in order to operate the backhoe tool. For example, the implement joystick 12 is reprogrammed to preform the bucket and swing operations of the backhoe, that is, one axis of the joystick 12 controls the curling, tilting and dumping functions of the bucket whereas the other axis of the joystick 12 controls the side-to-side movement thereof. On the other hand, the drive control joystick 18 is reprogrammed to perform the boom and stick operations of the backhoe tool, that is, one axis of the joystick 18 controls the up and down movement of the boom whereas the other axis of the joystick 18 will control the in and out movement of the stick relative to the boom. This reprogramming or reconfiguration of the operation of joysticks 12 and 18 is automatically accomplished by ECM 25 when ECM 25 recognizes the identification code associated with the backhoe tool. Again, this reprogramming is typically accomplished through the use of various look-up tables, maps, algorithms or other programming associated with ECM 25.

In the above example relating to use of a backhoe tool on a skid steer loader, operation of the direction control joystick 18 between its direction control or traveling mode wherein the joystick controls the actual movement of the skid steer loader, and digging mode wherein the joystick controls certain operations of the backhoe tool, switching back and forth between these two different modes of operation is typically accomplished through the use of a switch located in the operator compartment. Based upon the teachings of the present invention, ECM 25 could reprogram the function of one of the control switches already located in the operator compartment of a skid steer loader to function as the mode selector switch for designating the type of operation desired when joystick 18 is moved in a particular direction, that is, either directional control and movement of the machine or controlling certain operations of the backhoe tool.

Other machine parameters can likewise be electronically reconfigured based upon recognition of a particular work tool. Such additional parameters may include the range of motion of particular linkage associated with a particular work tool; varying the particular steering gain associated with the drive control joystick 18; and establishing a maximum forward speed for the work machine based upon the particular work tool being utilized. For example, a wide variety of different steering mode gains or correlations between actuation of the drive joystick 18 and control of the appropriate drive mechanism such as the transmission control valves 20 can be structured based upon the use of certain types of work tools in association with a particular work machine. For example, work tools such as a cold planer pavement profiler require the work machine to inch forward very slowly while the tool chews up concrete or other pavement. In this particular situation, a less responsive steering mode may be desired as compared to a normal mode of operation. Also, certain work tools used on certain types of work machines require high engine speed in order to operate the work tool properly. These higher operating engine speeds produce a higher output flow from the hydraulic pump which controls the drive mechanism. This creates a more responsive, less controllable steering command at high engine speeds. As a result, when these types of work tools are used, it is sometimes very difficult to accurately control the steering of the particular machine, particularly in space limited environments. Here again, a less responsive steering mode may be desired. Based upon the teachings of the present invention, the particular steering mode parameters associated with a specific work tool can be programmed into ECM 25, or into any other ECM associated with the work machine, and such steering gain parameters can be automatically selected by ECM 25 when such tool is properly recognized by ECM 25. Upon such recognition, ECM 25 will thereafter select the appropriate steering gain mode from a plurality of look-up tables, maps, or other algorithms stored within the memory of ECM 25 for that particular tool and then output appropriate signals to the respective control valves such as the valves 20 to provide the desired steering control when such tool is being utilized. Other transmission or drive inputs 35 may also be utilized to reconfigure any drive control parameters based upon use of a particular work tool.

In a similar fashion, the maximum forward speed of a particular work machine can likewise be reprogrammed or re-established based upon the particular type of tool being utilized. For example, in the case of a work machine employing a cold planer pavement profiler, the maximum forward speed of the work machine can be considerably reduced as compared to the same work machine utilizing a bucket or broom since use of the cold planer pavement profiler requires the work machine to inch forward very slowly during operation. In this particular situation, ECM 25 would again select the appropriate speed parameters from a look-up table, map or other programming associated with a particular work tool and thereafter input such speed parameters to the power train system associated with the particular work machine. Typically, the power train system would include an engine system ECM such as ECM 44 which would control the speed and operation of the machine engine, and a transmission system ECM such as ECM 34 which would control directional movement of the machine. This inputting of data from ECM 25 to ECMs 34 and 44 can again be accomplished through a serial communication link as shown in FIG. 1 and ECMs 34 and 44 would thereafter output appropriate signals via conductive paths 32 and 46 to the transmission control valves and to the governor, the injector control valves, or other appropriate engine components 48 as illustrated in FIG. 1. Other engine inputs 49 to ECM 44 may also be utilized to control and/or reconfigure any engine operating parameters based upon use of a particular work tool. Such additional engine inputs may include throttle position, engine speed, engine load, fuel flow, and other engine operating parameters.

In another aspect of the present invention, instead of utilizing a tool recognition system as explained above, all of the various operating parameters associated with a particular plurality of work tools can be stored or programmed into ECM 25 for access or call-up by the operator via an on-board computer system having operator selectable commands for selecting the operating parameters associated with any one of the plurality of different work tools. For example, the operator could access a computer menu through the electronic systems associated with the particular work machine wherein the computer menu would identify all of the various work tools usable with the work machine. The on-board computer system would further include means for selecting any one of such different work tools from the appropriate computer menu and, upon selection of a particular work tool, all of the operating parameters associated with such tool would be accessed and the work machine would be reconfigured in accordance with such parameters as explained above. Other operator selectable means are also recognized and anticipated for configuring a particular work machine in accordance with the operating parameters associated with a particular work tool.

It is also recognized and anticipated that operating parameters associated with certain types of work machines may not be included in the computer database of a particular work machine. In this event, in accordance with another aspect of the present invention, all of the operating parameters associated with a particular work tool can be inputted into ECM 25, or into any other ECM or computer system associated with the particular work machine, through a service tool or some other type of external device such as a laptop computer. For example, a software device such as a computer disk could be downloaded into the computer system or ECM 25 of a particular work machine through use of the service tool. This computer disk would contain all of the operating parameters associated with a particular work tool. This information would then be stored in the memory of ECM 25, or some other computer system, for future use when that particular work tool is to be utilized by that particular work machine.

It is also recognized and anticipated that the computer system associated with a particular work machine may include a program which could be accessed and activated for manually inputting the operating parameters of a particular work tool into ECM 25 or some other ECM associated with the work machine. This program would be a feedback type program which would step the operator through the various programming steps in order to input all of the operating parameters associated with a particular work tool into the computer system of the work machine. Here again, once these operating parameters for a particular work tool have been inputted and stored within a database associated with the work machine, such parameters are accessible for future use either through the tool recognition system 10 (FIG. 1) previously discussed above wherein ECM 25 will automatically electronically reconfigure the various hydraulic and control systems associated with a particular work machine to control the operation of a particular work tool, or such operating parameters could be accessed through other operator selectable means such as a computer menu or other operator selectable commands associated with the on-board computer system.

Electronic controllers or modules such as ECMs 25, 34 and 44 are commonly used in association with work machines for accomplishing various tasks. In this regard, ECMs 25, 34 and 44 will typically include processing means, such as a microcontroller or microprocessor, associated electronic circuitry such as input/output circuitry, analog circuits or programmed logic arrays, as well as associated memory. ECM 25 can therefore be programmed to sense and recognize the appropriate signals indicative of a particular work tool being attached to a work machine such as the work tool or attachment signal inputted to ECM 25 via conductive path 38. In addition, ECM 25 can be programmed to select and access the appropriate operating parameters for a particular work tool based upon the work tool signal 38 and thereafter output appropriate signals to accomplish certain tasks such as electronically reconfiguring the appropriate line relief valves, control valves and other system components impacted by the operating parameters of a particular work tool such as the control valves 14, 20, 42 and 48 illustrated in FIG. 1.

The present tool recognition and control system 10 will therefore electronically reconfigure various control systems associated with a particular work machine to control the operation of a particular work tool when such tool is recognized by the work machine, or when an operator selects specific work tool parameters through any suitable operator selectable means such as through a computer system having operator id selectable commands for selecting any one of a plurality of different work tool operating parameters. Once reconfigured, these various systems of the work machine will be compatible with the selected operating parameters associated with a particular work tool.

Industrial Applicability

As described herein, the present tool recognition and control system 10 has particular utility in any work machine or other stationary operating system wherein such machine or system controls the operation of a plurality of different work tools.

An example of operation in accordance with one aspect of the present invention is set forth in flow chart 50 illustrated in FIG. 2. The operating steps in control loop 50 can be incorporated into the programming of the processing means of ECM 25 by techniques well known to those of ordinary skill in the art.

At step 52, ECM 25 will attempt to identify the particular work tool 36 by reading the specific identification code associated therewith, which code is and inputted to ECM 25 via the work tool signal 38. This work tool signal is generated by appropriate circuitry or other electronics associated with the work tool such as the various coding and telemetry systems discussed above. If a tool recognition system as set forth and explained with reference to FIG. 1 is not incorporated into the particular work machine, the tool identification can likewise be accessed by the operator through a computer menu, a switch, or other operator selectable means associated with the work machine as likewise previously discussed. In this regard, at step 54, ECM 25 will determine if the tool identification code either inputted by the machine operator or accessed through a tool recognition system such as the system 10 of FIG. 1 is stored in a database associated with the work machine such as the memory associated with ECM 25. If the specific tool identification code is stored in a machine database, ECM 25 will disable the implement control system at step 56 and proceed to reconfigure the appropriate hydraulic and other control systems of the work machine based upon the work tool parameters stored in the database. More particularly, ECM 25 will reconfigure the implement joystick 12 and/or the drive control joystick 18, if necessary, as explained above at step 58; ECM 25 will reconfigure the operation of any control switches 16, if necessary, as explained above at step 60; and ECM 25 will output appropriate signals to the electronically adjustable line relief valves 42 to reconfigure the hydraulic pressures and flow rates accordingly at steps 62 and 64.

Still further, at step 66, ECM 25 may electronically reconfigure other machine parameters based upon the particular operating parameters of the work tool involved such as establishing a new maximum forward speed for the work machine, or establishing a new steering control gain or correlation based upon movement of the drive control joystick 18, if so required. Once ECM 25 has reconfigured or reprogrammed all of the machine parameters affected by the operation of the work tool identified through steps 52 and 54, ECM 25 will then allow the operator to enable the implement system at step 68 so that the work tool can be used. If the machine operator enables the implement control system in accordance with the particular enablement system associated with that particular work machine, ECM 25 will then allow the implement or work tool 36 to be controlled and operated at step 70.

If, on the other hand, at step 54, ECM 25 determines that the particular tool identification code inputted through a tool recognition system or other operator selectable means is not stored in any database associated with the particular work machine, ECM 25 will then allow the operator to input all of the various operating parameters associated with that particular work tool into the memory associated with ECM 25, or some other database associated with the particular work machine. Initial input of the work tool parameters can be accomplished through a feedback program associated with the on-board computer system of the work machine as previously explained, or through use of a service tool such as a laptop computer wherein the particular work tool parameters can be downloaded into the work machine computer system through use of computer disk or other input means. The various work tool parameters are inputted into the work machine at steps 72, 74, 76 and 78 and all such parameters are then saved to the appropriate work machine database at step 80. In some cases, the particular work tool or implement control system must be enabled and/or operated in order to establish and program the work tool parameters into ECM 25, or some other appropriate database. Once the work tool parameters are saved to a database at step 80, the implement control system is disabled at step 82 and the particular work tool is now ready for use subject to enablement of the implement control system by the operator at step 68.

Inputting and programming the various work tool parameters into ECM 25 via operating steps 72 through 80 of flow chart 50 has certain advantages in that this particular method for initially inputting the work tool parameters gives the machine operator the ability to set the various systems and controls of the work machine utilized for operation of a particular work tool to that particular operator's specific feel and control preferences. Once this initial set-up and work tool configuration is saved to a database at step 80, these particular parameters would be accessible each time that particular work tool was attached to the work machine.

It is also recognized that variations to the operating steps depicted in flow chart 50 could likewise be made without departing from the spirit and scope of the present invention. In particular, steps could be added or some steps could be eliminated. All such variations are intended to be covered by the present invention. Still further, it is also recognized that in most applications, a tool recognition and control system including ECM 25 would include a variety of other components such as other switches, solenoids, relays, indicators, sensors and other control apparatus.

It is still further recognized that a wide variety of different external devices, either mounted on the machine or used as service tools, such as a laptop computer can be utilized to input the various parameters associated with a particular work tool. This data and corresponding parameters could be inputted to ECM 25 via these external devices for use by the operator via the tool recognition system, or via other input devices such as a computer system having operator selectable commands whereby the newly inputted work tool parameters can be accessed, selected and utilized.

Other aspects, objects and advantages of the present invention can be obtained from a study of the drawings, the disclosure and the appended claims.

What is claimed is:

1. A control system for electronically configuring certain systems of a work machine wherein the work machine includes an implement system and other systems operable for controlling the operation of certain work tools which are mountable to the work machine, each work tool having a set of operating parameters associated therewith which affect the operation of at least some of the systems of the work machine used to control the operation of the work tools, said control system comprising:

at least one operator input device actuatable to control at least certain operations of a work tool when that work tool is mounted to the work machine;

means for selecting any one of a plurality of different sets of operating parameters for controlling at least certain operations of the work machine, each set of operating parameters corresponding to the operation of a different work tool when that work tool is mounted to the work tool; and an electronic controller coupled with said at least one operator input device and with said selecting means for receiving signals therefrom, said controller being operable to receive a signal from said selecting means indicative of which set of operating parameters have been selected for use, and a signal from said at last one operator input device indicative of controlling at least certain operations of a particular work tool based upon the selected set of operating parameters;

said electronic controller being further coupled with the implement and other systems of the work machine operable for controlling the operation of the work tools and outputting appropriate signals thereto for electronically configuring such systems in accordance with the selected set of operating parameters for a particular work tool when said controller receives a signal from the selecting means indicative of which set of operating parameters has been selected for use, said certain machine systems being thereafter configured such that operation of such systems will be compatible with the selected operating parameters for that particular work tool; and wherein the work machine includes a transmission system for controlling the direction of movement of the work machine and an operator input drive control device actuatable to command a particular direction of movement of the work machine, and wherein at least one of the parameters associated with the selected set of operating parameters affects the steering of the work machine, said electronic controller being coupled with said transmission system and with said operator input drive control device and outputting signals to said transmission system to control the steering operation of the work machine based upon said at least one parameter affecting such steering, said outputted signal being indicative of a particular steering mode gain effective between actuation of the operator input drive control device and operation of the transmission system.

* * * * *